United States Patent
Kim et al.

(10) Patent No.: US 8,406,406 B2
(45) Date of Patent: Mar. 26, 2013

(54) APPARATUS AND METHOD FOR PERFORMING CALL CONNECTION IN A COMMUNICATION SYSTEM

(75) Inventors: Deok-Ki Kim, Seongnam-si (KR); Jung-Soo Woo, Suwon-si (KR); Seung-Hoon Park, Seoul (KR); Su-Ryong Jeong, Suwon-si (KR); Young-Kyun Kim, Yongin-si (KR); Ho-Kyu Choi, Seongnam-si (KR)

(73) Assignee: Samsung Electronics Co., Ltd, Suwon-Si (KR)

( * ) Notice: Subject to any disclaimer, the term of this patent is extended or adjusted under 35 U.S.C. 154(b) by 1244 days.

(21) Appl. No.: 12/074,305

(22) Filed: Mar. 3, 2008

(65) Prior Publication Data
US 2008/0279358 A1 Nov. 13, 2008

(30) Foreign Application Priority Data

Mar. 2, 2007 (KR) .................. 10-2007-0020823

(51) Int. Cl.
*H04M 3/42* (2006.01)
(52) U.S. Cl. .......... 379/207.05; 379/207.07; 379/208.01
(58) Field of Classification Search ............. 379/207.05, 379/207.06, 207.07, 208.01, 209.01
See application file for complete search history.

(56) References Cited

U.S. PATENT DOCUMENTS

| | | | | |
|---|---|---|---|---|
| 5,309,512 A | * | 5/1994 | Blackmon et al. | 379/215.01 |
| 5,381,415 A | * | 1/1995 | Mizutani | 370/447 |
| 6,577,722 B1 | * | 6/2003 | Lippincott | 379/215.01 |
| 6,768,792 B2 | * | 7/2004 | Brown et al. | 379/207.14 |
| 2007/0121831 A1 | * | 5/2007 | Kim et al. | 379/93.31 |

FOREIGN PATENT DOCUMENTS

| | | | |
|---|---|---|---|
| KR | 1020030076078 | * | 9/2003 |
| KR | 1020030076078 A | | 9/2003 |
| KR | 1020040009241 A | | 1/2004 |
| KR | 1020040094545 A | | 11/2004 |
| KR | 1020040102646 | * | 12/2004 |
| KR | 1020040102646 A | | 12/2004 |

OTHER PUBLICATIONS

Translation of KR 1020030076078.*
Office Action dated Oct. 20, 2009 in connection with Korean Patent Application No. 10-2007-0020823.

* cited by examiner

*Primary Examiner* — Ahmad Matar
*Assistant Examiner* — Nafiz E Hoque

(57) ABSTRACT

A call connection method and apparatus in a communication system are provided, in which a call connection request message is received from each of first and second terminals, it is determined whether the first and second terminals are requesting a call connection to each other, one of the first and second terminals is selected if the first and second terminals are requesting a call connection to each other, the call connection request of the selected terminal is rejected, and a call is connected between the first and second terminals by performing a call connection to the selected terminal according to the call connection request of the non-selected terminal.

2 Claims, 9 Drawing Sheets

APPARATUS AND METHOD FOR PERFORMING CALL CONNECTION IN A COMMUNICATION SYSTEM

CROSS-REFERENCE TO RELATED PATENT APPLICATION

This application claims the benefit under 35 U.S.C. §119 (a) of a Korean Patent Application filed in the Korean Intellectual Property Office on Mar. 2, 2007 and assigned Serial No. 2007-20823, the entire disclosure of which is hereby incorporated by reference.

BACKGROUND OF THE INVENTION

1. Field of the Invention

The present invention generally relates to a communication system. More particularly, the present invention relates to an apparatus and method for connecting a call.

2. Description of the Related Art

In the present communication systems, a terminal, for example, a wired one or a wireless one attempts to connect a call to communicate with another terminal. For the call connection, the terminal transmits a call connection request message to an exchange that manages calls for the terminal, to thereby communicate with the other terminal.

Conventionally, when a first terminal attempts to connect a call to a busy second terminal, the second terminal can be notified of the call connection request. This is called "call waiting service". The call waiting service enables the first terminal to communicate with the second terminal by the notification of the call connection request from the first terminal, even when the second terminal is busy.

However, if a terminal requests a call connection to a second terminal that is requesting a call connection to a third terminal or is receiving a call connection request from the third terminal, it receives a busy message indicating that the second terminal is busy. Especially when a communication service is suddenly discontinued during a conversation between terminals, they request a call connection to each other. Consequently, even though a call connection is in progress for them, that is, they are in a call connecting state, they just receive busy messages. An operation of terminals in the call connecting state will be described below.

FIG. 1 is a diagram illustrating a signal flow when terminals request a call connection to each other simultaneously in a conventional communication system.

Referring to FIG. 1, the communication system includes an exchange 110, a first terminal 120 (terminal 1), and a second terminal 130 (terminal 2).

The exchange 110 can be incorporated into or connected to a Base Station (BS), a Base Station Controller (BSC), or the like, if the terminals 120 and 130 are wireless terminals. The exchange 110 provides a communication service to terminals by operations including call connection and call release in the communication system.

When terminal 1 determines to connect a call to terminal 2, it transmits a call connection request message requesting a call connection to terminal 2 to the exchange 110 in step 111.

When terminal 2 also determines to connect a call to terminal 1, it transmits a call connection request message requesting a call connection to terminal 1 to the exchange 110 in step 113.

The exchange 110 transmits a call connection attempt message to terminal 2 in response to the call connection request of terminal 1 in step 115.

Since terminal 2 is also requesting the call connection to terminal 1, the call connection between them is impossible. Hence, terminal 2 transmits a busy message to the exchange 110 in step 117.

In step 119, the exchange 110 transmits a call connection attempt message to terminal 1 in response to the call connection request of terminal 2.

Since terminal 1 is also requesting the call connection to terminal 2, the call connection between them is impossible. Hence, terminal 1 transmits a busy message to the exchange 110 in step 121.

The exchange 110 transmits a message indicating that terminal 2 is busy to terminal 1 in step 123.

Also, the exchange 110 transmits a message indicating that terminal 1 is busy to terminal 2 in step 125.

As described above, when terminals request a call to each other simultaneously, they receive wrong state information indicating that the other party is busy although the other party is not.

FIG. 2 is a diagram illustrating a signal flow when a terminal receives another call connection request from a second terminal during receiving a call connection request from a third terminal in the conventional communication system.

Referring to FIG. 2, the communication system includes an exchange 210, a first terminal 220 (terminal 1), a second terminal 230 (terminal 2), and a third terminal 240 (terminal 3).

The exchange 210 can be incorporated into or connected to a BS, a BSC, or the like, if the terminals 220, 230 and 240 are wireless ones. The exchange 210 provides a communication service to terminals by operations including call connection and call release in the communication system.

When terminal 3 determines to connect a call to terminal 1, it transmits a call connection request message requesting a call connection to terminal 1 to the exchange 210 in step 211.

When terminal 2 also determines to connect a call to terminal 1, it transmits a call connection request message requesting a call connection to terminal 1 to the exchange 210 in step 213.

The exchange 210 transmits a call connection attempt message to terminal 1 in response to the call connection request of terminal 3 in step 215.

The exchange 210 also transmits a call connection attempt message to terminal 1 in response to the call connection request of terminal 2 in step 217.

However, since terminal 1 is receiving the call connection request from terminal 3, the call connection between terminal 1 and terminal 2 is impossible. Hence, terminal 1 transmits a busy message to the exchange 210 in step 219.

The exchange 210 transmits a message indicating that terminal 1 is busy to terminal 2 in step 220.

As described above, when a terminal (e.g. terminal 1) receives another call connection request from terminal 2, for example, during receiving a call connection request, terminal 2 receives wrong state information indicating that terminal 1 is busy although it is not.

FIG. 3 is a diagram illustrating a signal flow when a terminal receives a call connection request from a second terminal during requesting a call connection to a third terminal in the conventional communication system.

Referring to FIG. 3, the communication system includes an exchange 310, a first terminal 320 (terminal 1), a second terminal 330 (terminal 2), and a third terminal 340 (terminal 3).

The exchange 310 can be incorporated into or connected to a BS, a BSC, or the like, if the terminals 320, 330 and 340 are wireless terminals. The exchange 310 provides a communication service to terminals by operations including call connection and call release in the communication system.

When terminal 1 determines to connect a call to terminal 3, it transmits a call connection request message requesting a call connection to terminal 3 to the exchange 310 in step 311.

When terminal 2 also determines to connect a call to terminal 1, it transmits a call connection request message requesting a call connection to terminal 1 to the exchange 310 in step 313.

The exchange 310 transmits a call connection attempt message to terminal 3 in response to the call connection request of terminal 1 in step 315.

The exchange 310 also transmits a call connection attempt message to terminal 1 in response to the call connection request of terminal 2 in step 317.

However, since terminal 1 is requesting the call connection request to terminal 3, the call connection between terminal 1 and terminal 2 is impossible. Hence, terminal 1 transmits a busy message to the exchange 310 in step 319.

The exchange 310 transmits a message indicating that terminal 1 is busy to terminal 2 in step 321.

As described above, when terminal 1 requests a call connection to terminal 3 during receiving a call connection request from terminal 2, terminal 2 receives wrong state information indicating that terminal 1 is busy although it is not.

In this manner, although a call connection is in progress between first and second terminals, the exchange transmits wrong information indicating that the other party is busy to each of the terminals. When a third terminal requests a call connection to one of the first and second terminals that are placed in the call connecting state, the exchange also transmits to the third terminal wrong information indicating that the first or second terminal is busy.

Especially, when an on-going call is interrupted in a wireless communication system, terminals can request a call connection to each other at the same time. In this case, the terminals have no way in finding out that the call connection is in progress, simply determining that the other party is busy.

SUMMARY OF THE INVENTION

An aspect of exemplary embodiments of the present invention is to address at least the problems and/or disadvantages and to provide at least the advantages described below. Accordingly, an aspect of exemplary embodiments of the present invention is to provide an apparatus and method for connecting a call in a communication system.

Another aspect of exemplary embodiments of the present invention provides a call connection apparatus and method for confirming the state of terminals for which a call connection is going on in a communication system.

A further aspect of exemplary embodiments of the present invention provides an apparatus and method for connecting a call between terminals for which a call connection is going on in a communication system.

In accordance with an aspect of exemplary embodiments of the present invention, there is provided a call connection method in a communication system, in which a call connection request message is received from each of first and second terminals, it is determined whether the first and second terminals are requesting a call connection to each other, one of the first and second terminals is selected if the first and second terminals are requesting a call connection to each other, the call connection request of the selected terminal is rejected, and a call is connected between the first and second terminals by performing a call connection to the selected terminal according to the call connection request of the non-selected terminal.

In accordance with another aspect of exemplary embodiments of the present invention, there is provided a call connection method in a communication system, in which a call connection request message requesting a call connection to a first terminal is received from a third terminal, it is determined whether the first terminal is in a call connecting state, and call connecting state information about the first terminal is transmitted to the third terminal, if the first terminal is in a call connecting state with a second terminal.

In accordance with a further aspect of exemplary embodiments of the present invention, there is provided a call connection apparatus in a communication system, in which an exchange receives a call connection request message from each of first and second terminals, determines whether the first and second terminals are requesting a call connection to each other, selects one of the first and second terminals if the first and second terminals are requesting a call connection to each other, rejects the call connection request of the selected terminal, and connects a call between the first and second terminals by performing a call connection to the selected terminal according to the call connection request of the non-selected terminal.

In accordance with still another aspect of exemplary embodiments of the present invention, there is provided a call connection apparatus in a communication system, in which an exchange receives a call connection request message requesting a call connection to a first terminal from a third terminal, determines whether the first terminal is in a call connecting state, and transmits call connecting state information about the first terminal to the third terminal, if the first terminal is in a call connecting state with a second terminal.

BRIEF DESCRIPTION OF THE DRAWINGS

The above and other objects, features and advantages of certain exemplary embodiments of the present invention will be more apparent from the following detailed description taken in conjunction with the accompanying drawings, in which.

Throughout the drawings, the same drawing reference numerals will be understood to refer to the same elements, features and structures.

DETAILED DESCRIPTION OF EXEMPLARY EMBODIMENTS

The matters defined in the description such as a detailed construction and elements are provided to assist in a comprehensive understanding of exemplary embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide an apparatus and method for performing a call connection in a communication system. For this purpose, for terminals for which a call connection is in progress, an exchange releases a call connection request from a specific one of the terminals and connects a call between the terminals by a call connection request message from the other terminal. Also, the exchange notifies a third terminal requesting a call connection to a terminal that is transmitting or receiving a call connection to or from another terminal, of the state of the terminal.

The communication system includes wired terminals or wireless terminals, for example. The exchange connects a call between terminals. If terminals are wireless, the exchange is incorporated into a BS, a BSC, or a Mobile Switching Center (MSC), for example. The exchange controls a wired or wireless link and manages information about terminals. The exchange also takes charge of call processes such as call connection, call setup, and call release in order to provide communication services.

Now a description will first be made of communication systems according to exemplary embodiments of the present invention.

Figure 4:
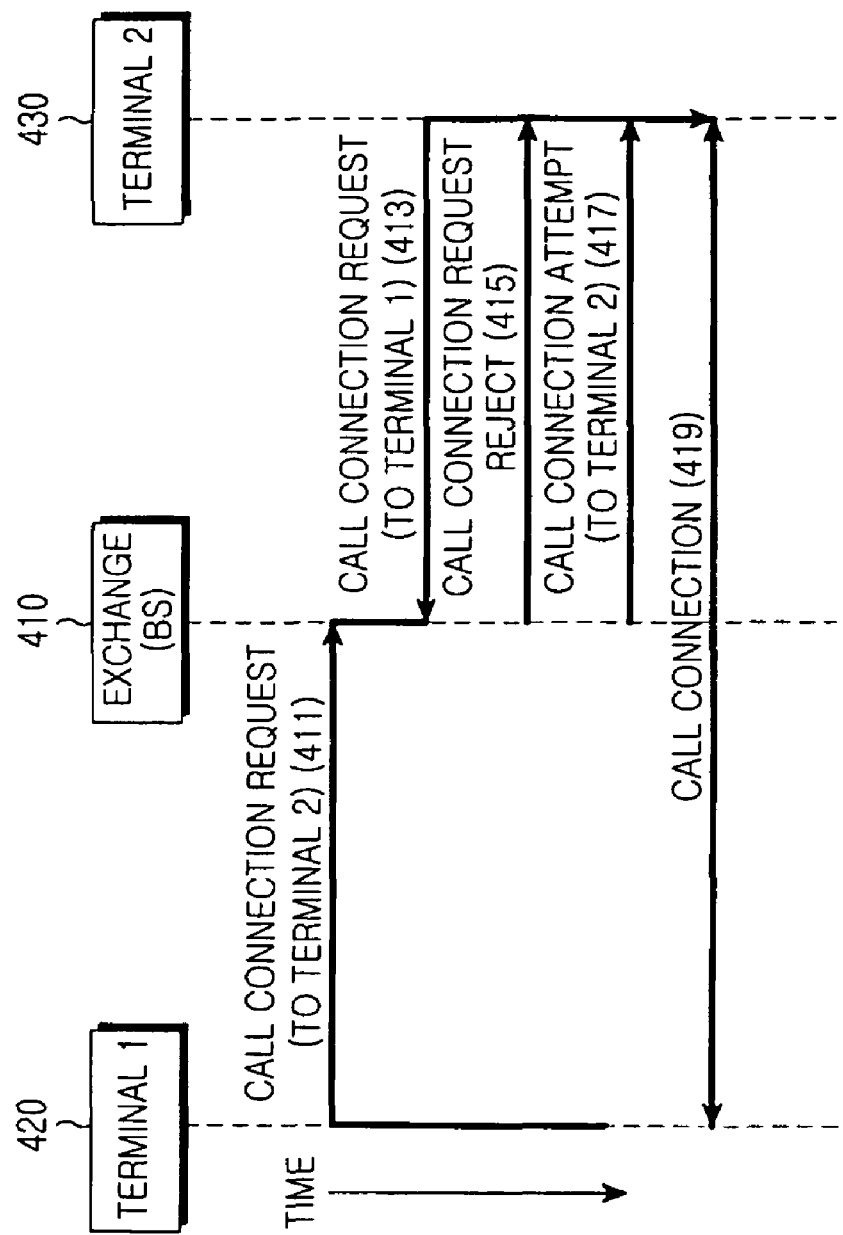
FIG. 4 is a diagram illustrating a signal flow for a call connection according to an exemplary embodiment of the present invention.

FIG. 4 is a diagram illustrating a signal flow for a call connection according to an exemplary embodiment of the present invention.

Referring to FIG. 4, the communication system includes an exchange 410, a first terminal 420 (terminal 1), and a second terminal 430 (terminal 2).

When terminal 1 determines to connect a call to terminal 2, it transmits a call connection request message requesting a call connection to terminal 2 to the exchange 410 in step 411.

When terminal 2 also determines to connect a call to terminal 1, it transmits a call connection request message requesting a call connection to terminal 1 to the exchange 410 in step 413.

The exchange 410 determines whether terminal 1 and terminal 2 are receiving the call connection request messages from each other. If the terminals are requesting the call connection to each other, the exchange 410 selects a predetermined one of the terminals and establishes the call connection between the terminals.

The exchange 410 selects terminal 2 and transmits to terminal 2 a call connection request reject message rejecting the call connection request of terminal 2 in step 415. According to the occurrence order of the call connection requests, for example, the exchange 410 selects terminal 2 that has requested the call connection later than terminal 1 and rejects the call connection request of terminal 2, that is, forcedly. If terminals request a call connection simultaneously, a terminal whose call connection request is to be rejected can be preset, or the exchange selects a terminal whose call connection request is to be rejected.

The exchange 410 transmits a call connection attempt message to terminal 2, treating the call requested by terminal 1 with priority in step 417.

If terminal 1 and terminal 2 request a call connection simultaneously, a call is connected between terminal 1 and terminal 2 by rejecting the call connection request of a predetermined terminal, terminal 2, for example.

Figure 5:
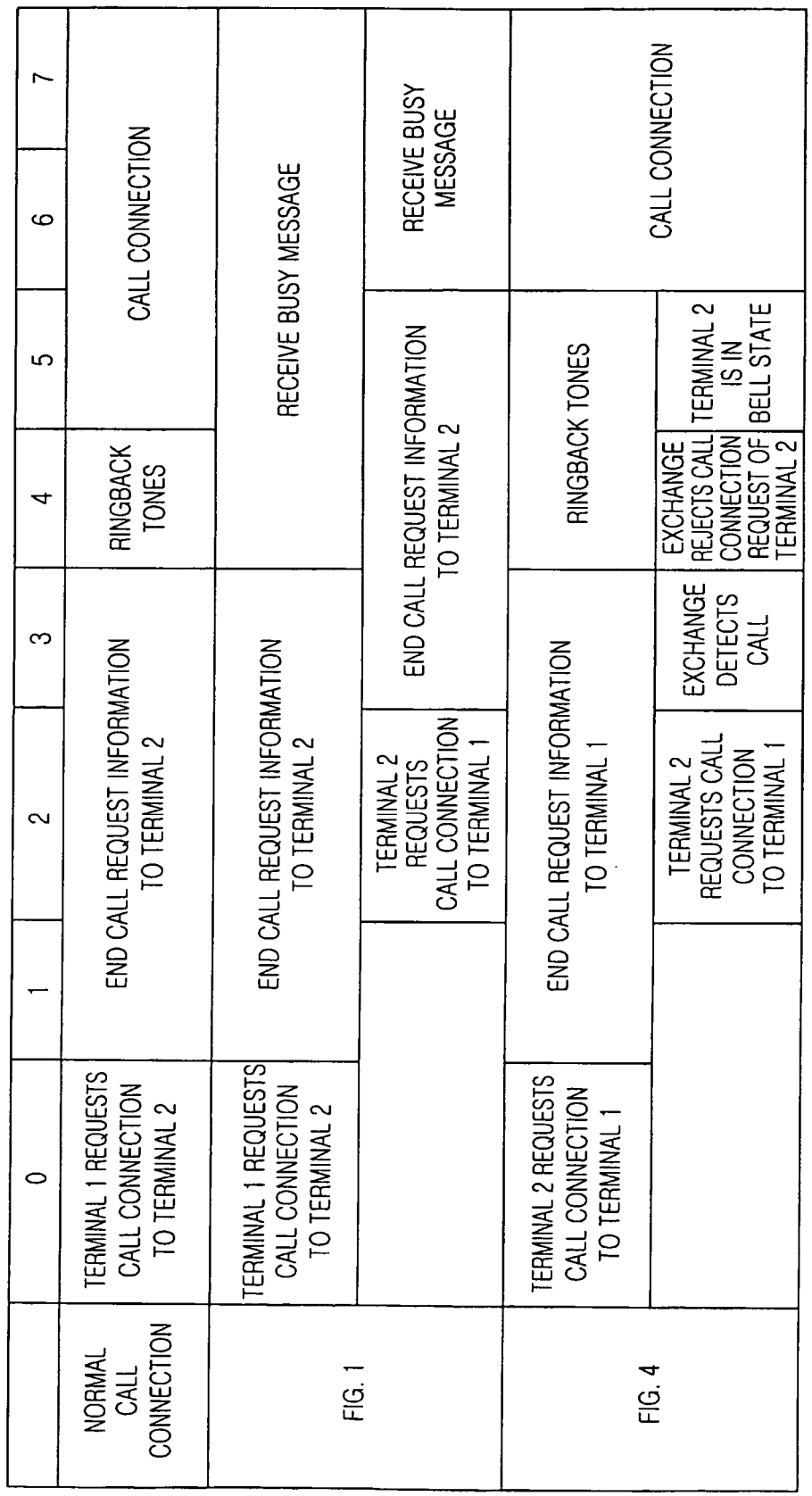
FIG. 5 is a table describing call connection operation states according to the exemplary embodiment of the present invention.

FIG. 5 is a table describing call connection operation states according to the exemplary embodiment of the present invention. Call connection operations of terminal 1 and terminal 2 over time instants 0 to 7 are described.

Referring to FIG. 5, in the case of a normal call connection, terminal 1 transmits a call connection request message requesting a call connection to terminal 2 to the exchange at time 0. The exchange then transmits a call connection attempt message, that is, call request information to terminal 2 at time 1, 2 and 3. Terminal 1 then receives ringback tones at time 4 and a call is connected between terminal 1 and terminal 2 at time 5, 6 and 7.

Figure 1:
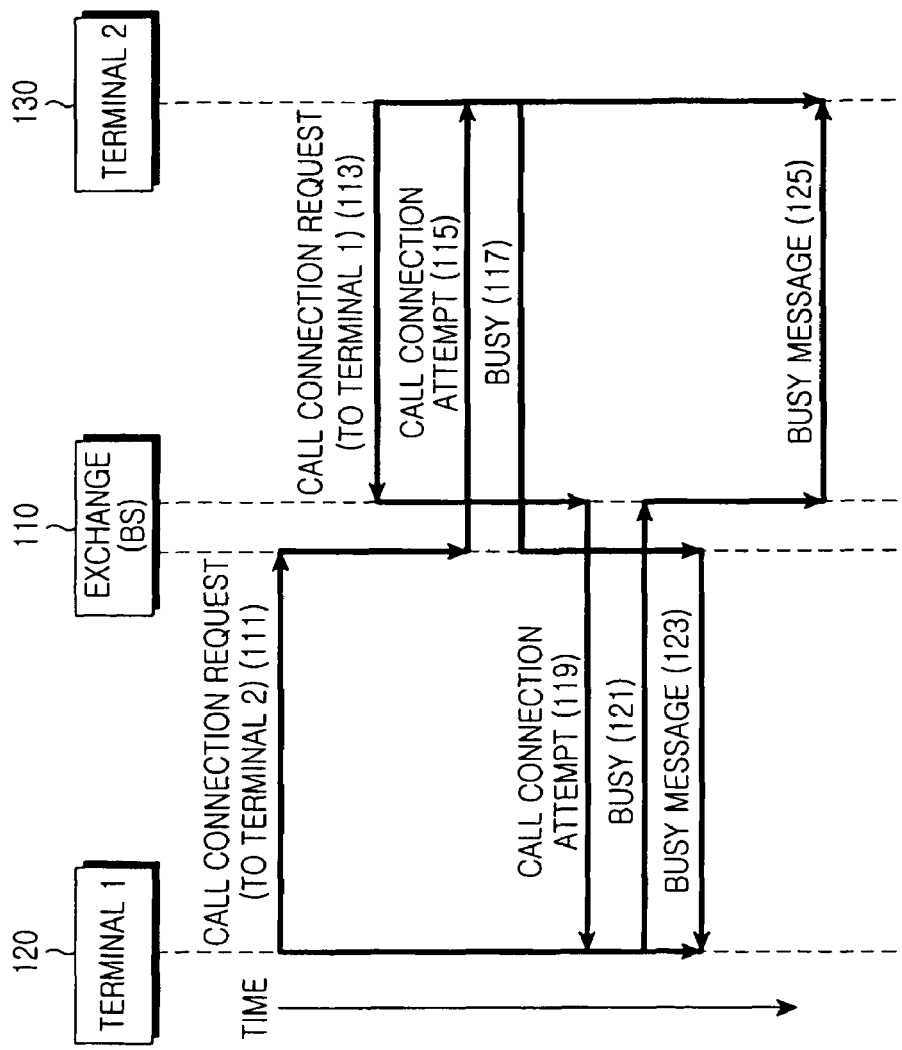
FIG. 1 is a diagram illustrating a signal flow when terminals request a call connection to each other simultaneously in a conventional communication system.

In the case of the conventional call connection illustrated in FIG. 1, terminal 1 transmits a call connection request message requesting a call connection to terminal 2 to the exchange at time 0. The exchange then transmits a call connection attempt message, that is, call request information to terminal 2 at time 1, 2 and 3.

At time 2, terminal 2 also transmits a call connection request message requesting a call connection to terminal 1 to the exchange. The exchange transmits a call request attempt message, that is, call request information to terminal 1 at time 3, 4 and 5.

Since the two terminals are requesting the call connection to each other, they receive busy messages from each other at time 4 to 7 and at time 6 and 7, respectively.

In the case of the call connection illustrated in FIG. 4, terminal 1 transmits a call connection request message requesting a call connection to terminal 2 to the exchange at time 0. The exchange then transmits a call connection attempt message, that is, call request information to terminal 2 at time 1, 2 and 3.

At time 2, terminal 2 also transmits a call connection request message requesting a call connection to terminal 1 to the exchange. The exchange detects a call from terminal 1, i.e. detects that terminal 1 is requesting the call connection to terminal 2 at time 3.

The exchange selects terminal 2 and rejects the call connection request of the terminal 2 at time 4. Thus, terminal 2 is placed in a bell state at time 5. The bell state is a state where a terminal requests reception of a signal from another terminal and rings tones (e.g. for an incoming call) are ringing from the terminal.

Terminal 1 receives ring-back tones (e.g. for an outgoing call) from terminal 2 at time 4 and 5. At time 6 and 7, a call is connected between terminal 1 and terminal 2.

Figure 6:
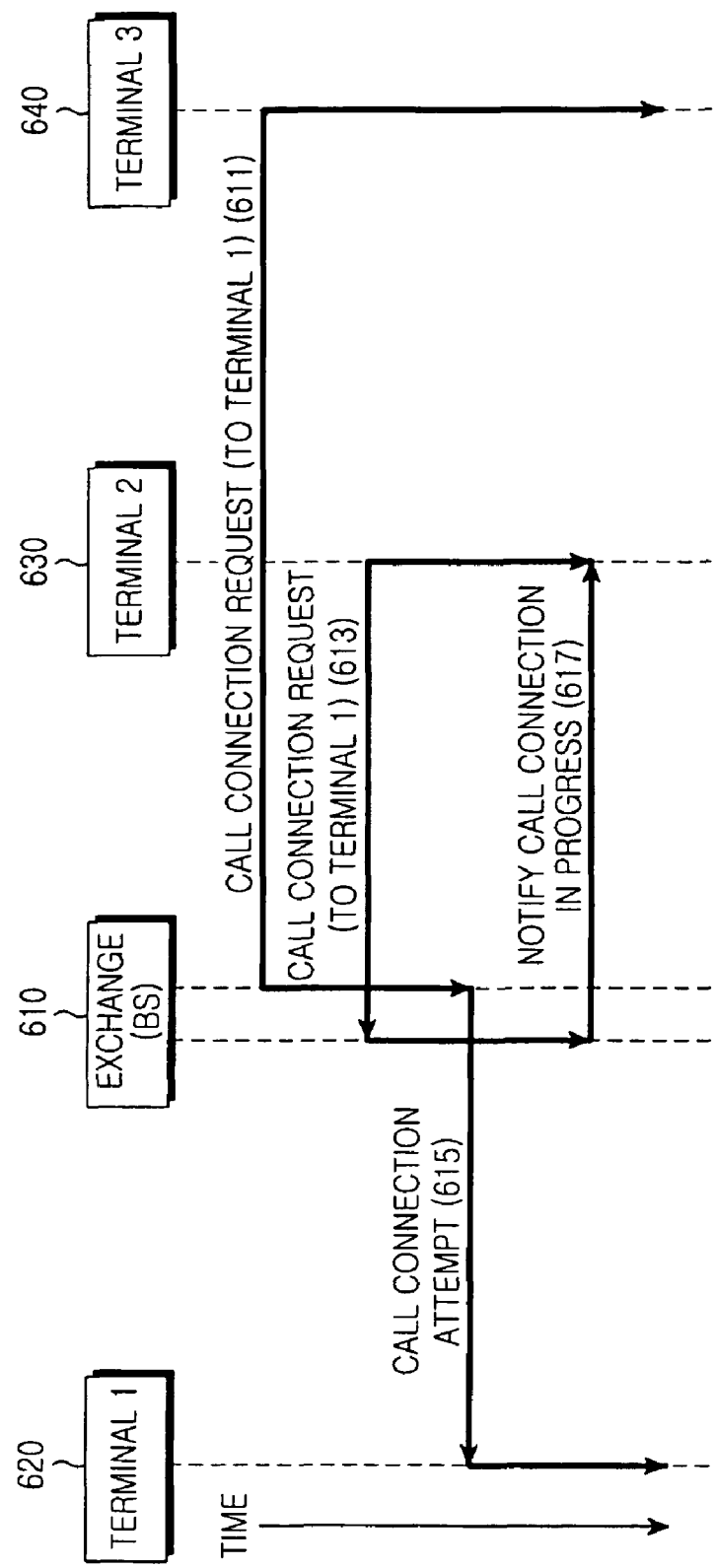
FIG. 6 is a diagram illustrating a signal flow for a call connection according to another exemplary embodiment of the present invention.

FIG. 6 is a diagram illustrating a signal flow for a call connection according to another exemplary embodiment of the present invention.

Referring to FIG. 6, the communication system includes an exchange 610, a first terminal 620 (terminal 1), a second terminal 630 (terminal 2), and a third terminal 640 (terminal 3).

When terminal 3 determines to connect a call to terminal 1, it transmits a call connection request message requesting a call connection to terminal 1 to the exchange 610 in step 611.

When terminal 2 also determines to connect a call to terminal 1, it transmits a call connection request message requesting a call connection to terminal 1 to the exchange 610 in step 613.

In step 615, the exchange 610 transmits a call connection attempt message to terminal 1 in response to the call connection request of terminal 3.

The exchange 610 determines whether terminal 1 is receiving a call connection request from a terminal other than terminal 2 in response to the call connection request of terminal 2.

If terminal 1 is receiving a call connection request from a terminal other than terminal 2, the exchange 610 transmits to terminal 2 a message indicating that terminal 1 is connecting a call to a terminal other than terminal 2, that is, terminal 1 is receiving another call connection request message in step 617.

Figure 7:
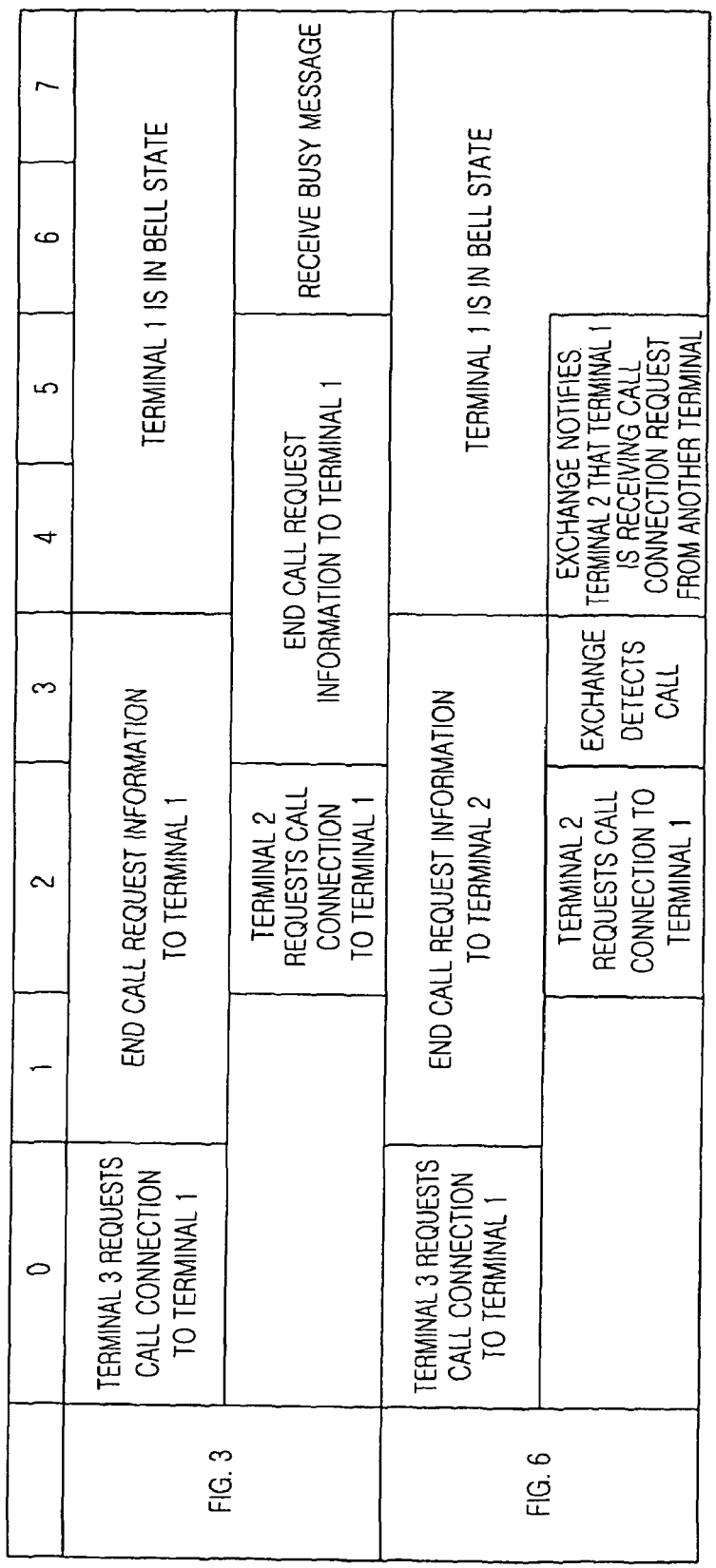
FIG. 7 is a table describing call connection operation states according to the second exemplary embodiment of the present invention.

FIG. 7 is a table describing call connection operation states according to the second exemplary embodiment of the present invention. Call connection operations of terminal 1, terminal 2, and terminal 3 over time instants 0 to 7 are described.

Figure 2:
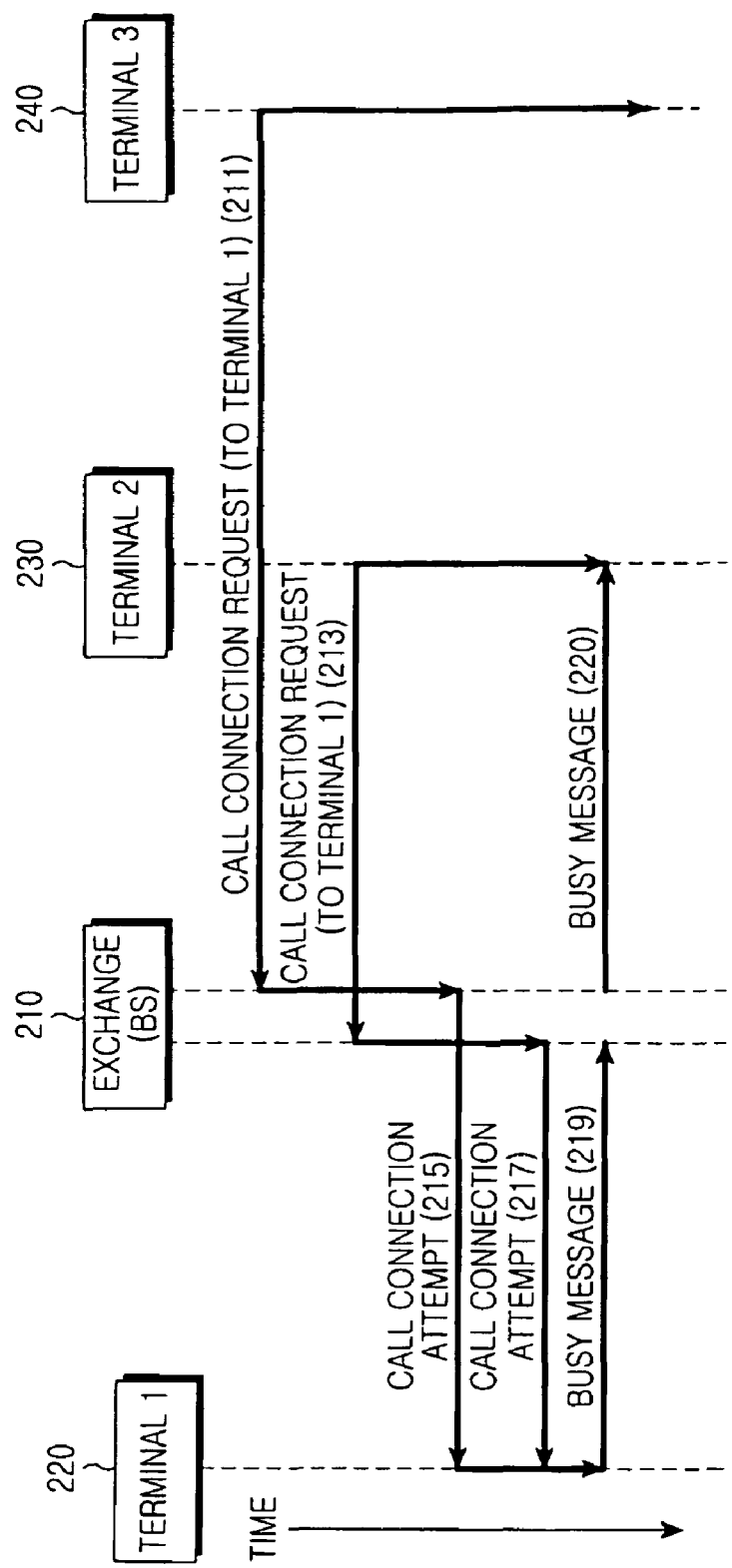
FIG. 2 is a diagram illustrating a signal flow when a terminal receives another call connection request from a second terminal during receiving a call connection request from a third terminal in the conventional communication system.

Referring to FIG. 7, in the case of the conventional call connection illustrated in FIG. 2, terminal 3 transmits a call connection request message requesting a call connection to terminal 1 to the exchange at time 0. The exchange then transmits a call connection attempt message, that is, call request information to terminal 1 at time 1, 2 and 3.

At time 2, terminal 2 also transmits a call connection request message requesting a call connection to terminal 1 to the exchange. The exchange transmits a call connection attempt message, that is, call request information to terminal 1 at time 3, 4 and 5.

Terminal 1 is placed in the bell state at time 4 to 7. However, terminal 2 receives a message that terminal 1 is busy at time 6 and 7.

In the case of the call connection illustrated in FIG. 6, terminal 3 transmits a call connection request message requesting a call connection to terminal 1 to the exchange at time 0. The exchange then transmits a call connection attempt message, that is, call request information to terminal 1 at time 1, 2 and 3.

At time 2, terminal 2 also transmits a call connection request message requesting a call connection to terminal 1 to the exchange. The exchange determines whether terminal 1 is connecting a call to a terminal other than terminal 2, that is, terminal 1 is receiving another call connection request from a terminal other than terminal 2 at time 3.

If terminal 1 is receiving another call connection request from a terminal other than terminal 2, the exchange transmits a message indicating terminal 1 is connecting a call (i.e. terminal 1 is receiving another call connection request) to terminal 2 at time 4 and 5.

Terminal 1 is placed in the bell state at time 4 to 7.

Figure 8:
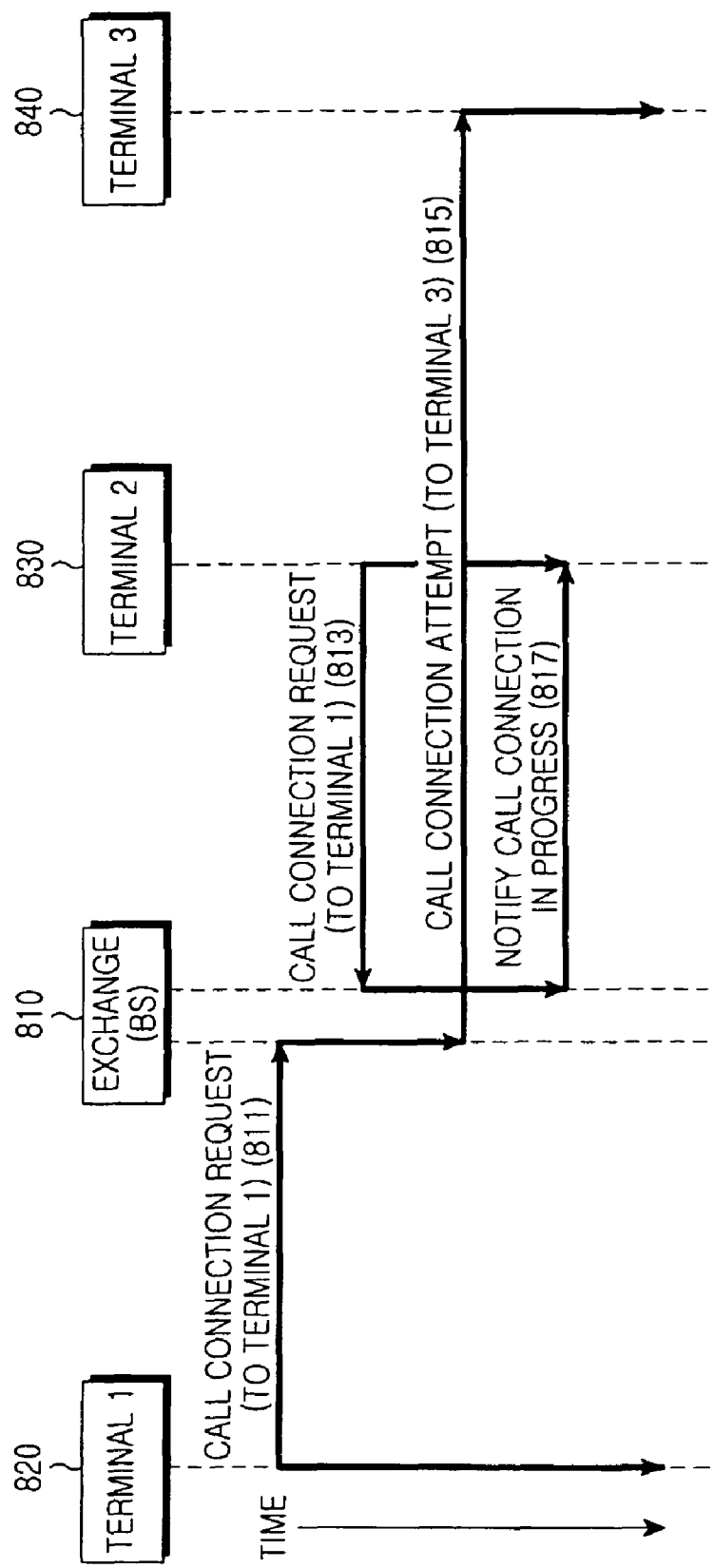
FIG. 8 is a diagram illustrating a signal flow for a call connection according to a third exemplary embodiment of the present invention.

FIG. 8 is a diagram illustrating a signal flow for a call connection according to a third exemplary embodiment of the present invention.

Referring to FIG. 8, the communication system includes an exchange 810, a first terminal 820 (terminal 1), a second terminal 830 (terminal 2), and a third terminal 840 (terminal 3).

When terminal 1 determines to connect a call to terminal 3, it transmits a call connection request message requesting a call connection to terminal 3 to the exchange 810 in step 811.

When terminal 2 also determines to connect a call to terminal 1, it transmits a call connection request message requesting a call connection to terminal 1 to the exchange 810 in step 813.

In step 815, the exchange 810 transmits a call connection attempt message to terminal 3 in response to the call connection request of terminal 1.

The exchange 810 determines whether terminal 1 is connecting a call to a terminal other than terminal 2 in response to the call connection request of terminal 2.

If terminal 1 is connecting a call to a terminal other than terminal 2, the exchange 810 transmits to terminal 2 a message indicating that terminal 1 is connecting a call to a terminal other than terminal 2, that is, terminal 1 is transmitting a call connection request message to another terminal in step 817.

Figure 9:
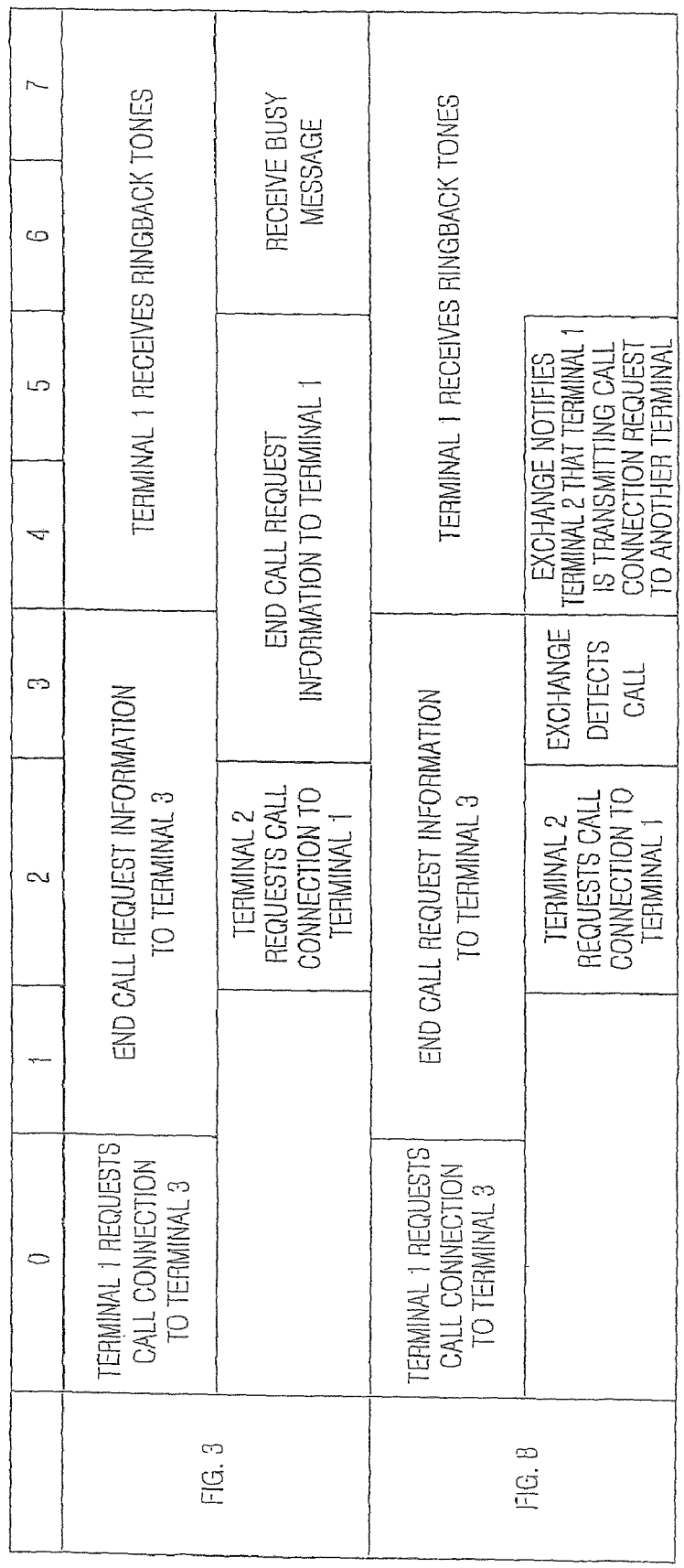
FIG. 9 is a table describing call connection operation states according to the third exemplary embodiment of the present invention.

FIG. 9 is a table describing call connection operation states according to the third exemplary embodiment of the present invention. Call connection operations of terminal 1, terminal 2, and terminal 3 over a series of time instants 0 to 7 are described.

Figure 3:
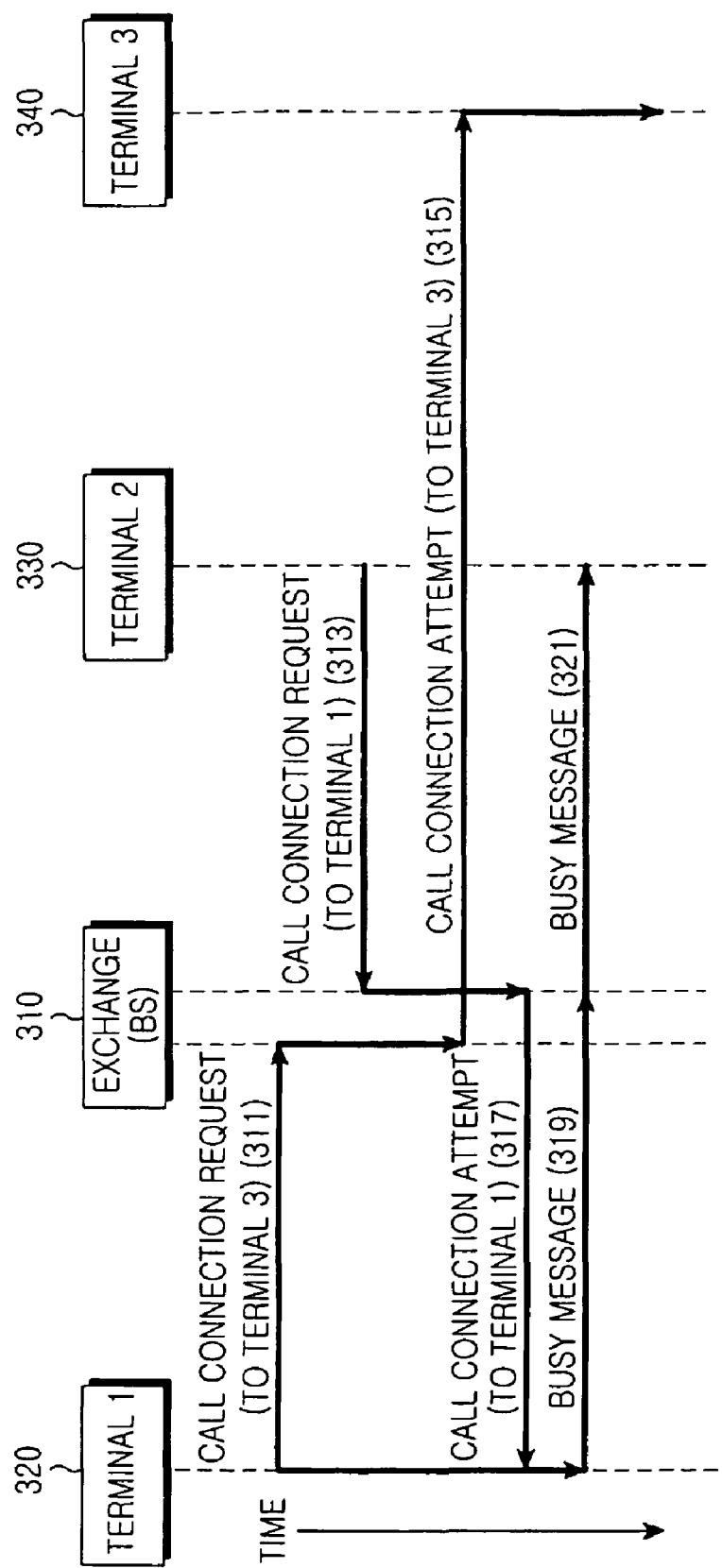
FIG. 3 is a diagram illustrating a signal flow when a terminal receives a call connection request from a second terminal during requesting a call connection to a third terminal in the conventional communication system.

Referring to FIG. 7, in the case of the conventional call connection illustrated in FIG. 3, terminal 1 transmits a call connection request message requesting a call connection to terminal 3 to the exchange at time 0. The exchange then transmits a call connection attempt message, that is, call request information to terminal 3 at time 1, 2 and 3.

At time 2, terminal 2 also transmits a call connection request message requesting a call connection to terminal 1 to the exchange. The exchange transmits a call request attempt message, that is, call request information to terminal 1 at time 3, 4 and 5.

Terminal 1 receives ring-back tones from terminal 3 at time 4 to 7. On the other hand, terminal 2 receives a message indicating that terminal 1 is busy at time 6 and 7.

In the case of the call connection illustrated in FIG. 8, terminal 1 transmits a call connection request message requesting a call connection to terminal 3 to the exchange at time 0. The exchange then transmits a call connection attempt message, that is, call request information to terminal 3 at time 1, 2 and 3.

At time 2, terminal 2 also transmits a call connection request message requesting a call connection to terminal 1 to the exchange. The exchange determines whether terminal 1 is connecting a call to a terminal other than terminal 2, that is, terminal 1 is transmitting a call connection request to a terminal other than terminal 2 at time 3.

If terminal 1 is requesting a call connection to a terminal other than terminal 2, the exchange transmits a message indicating terminal 1 is connecting a call (i.e. terminal 1 is transmitting a call connection request) to terminal 2 at time 4 and 5. Herein, terminal 1 is receiving ring-back tones from terminal 3 at time 4 to 7.

As illustrated in FIGS. 6 and 8, therefore, terminal 2, which is requesting a call connection to terminal 1, receives a message indicating that a call connection is in progress between terminal 1 and terminal 3, for example, a voice message saying "terminal 1 is requesting a call connection to another terminal" or "terminal 1 is receiving a call connection request from another terminal". Thus, terminal 2 can determine that terminal 1 is in a call connecting state.

As is apparent from the above description, the present invention advantageously enables confirmation of the states of terminals that are in a call connecting state in a communication system by proposing a call connection technique for the terminals in the call connecting state. Even when the terminals in the call connecting state request a call connection to each other simultaneously, a call can be connected between them.

While the invention has been shown and described with reference to certain exemplary embodiments of the present invention thereof, it will be understood by those skilled in the art that various changes in form and details may be made therein without departing from the spirit and scope of the present invention as defined by the appended claims and their equivalents.

What is claimed is:

1. A call connection method in a communication system, comprising:
    receiving a call connection request message requesting a call connection to a first terminal from a third terminal;
    identifying whether the first terminal is in a call connecting state; and
    transmitting call connecting state information about the first terminal to the third terminal, when the first terminal is in a call connecting state with a second terminal,
    wherein the call connecting state information includes a voice message that indicates that the first terminal has received or requested a call connection from or to the second terminal but the call connection has not yet been connected.

2. A call connection apparatus in a communication system, comprising:
    an exchange configured to receive a call connection request message requesting a call connection to a first terminal from a third terminal, identify whether the first terminal is in a call connecting state, and transmit call connecting state information about the first terminal to the third terminal, when the first terminal is in a call connecting state with a second terminal,
    wherein the call connecting state information includes a voice message that indicates that the first terminal has received or requested a call connection from or to the second terminal but the call connection has not yet been connected.

* * * * *